Dec. 29, 1936.    P. J. KROLL    2,065,714
COMBINED VEHICLE LIFTING AND ROCKING APPARATUS
Filed Dec. 18, 1934    2 Sheets-Sheet 1
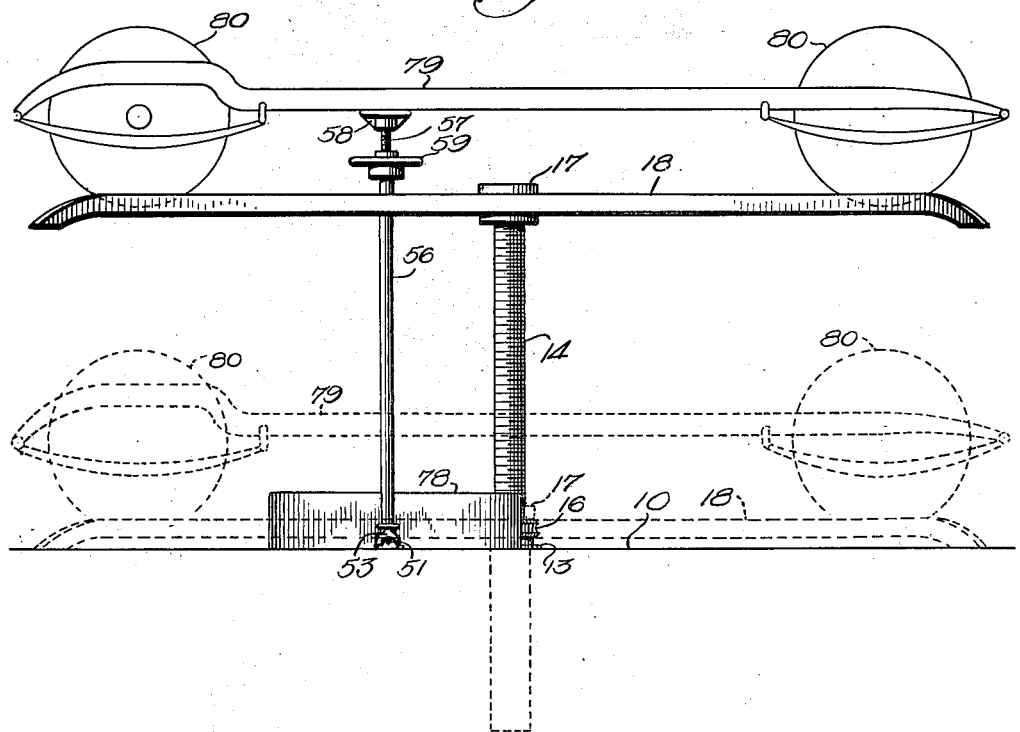
Fig. 1.
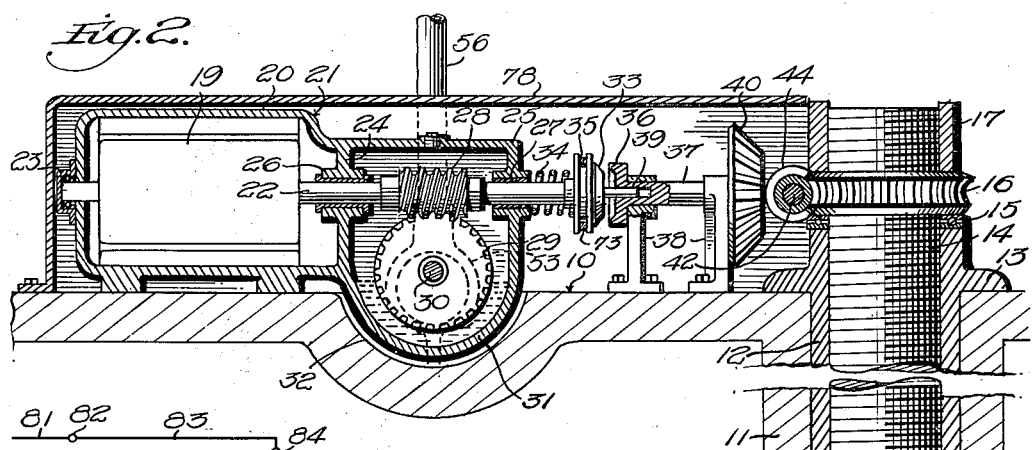
Fig. 2.
Fig. 6.
Inventor
P. J. KROLL
By C. L. Parker, Jr.
Attorney Dec. 29, 1936.   P. J. KROLL   2,065,714
COMBINED VEHICLE LIFTING AND ROCKING APPARATUS
Filed Dec. 18, 1934   2 Sheets-Sheet 2
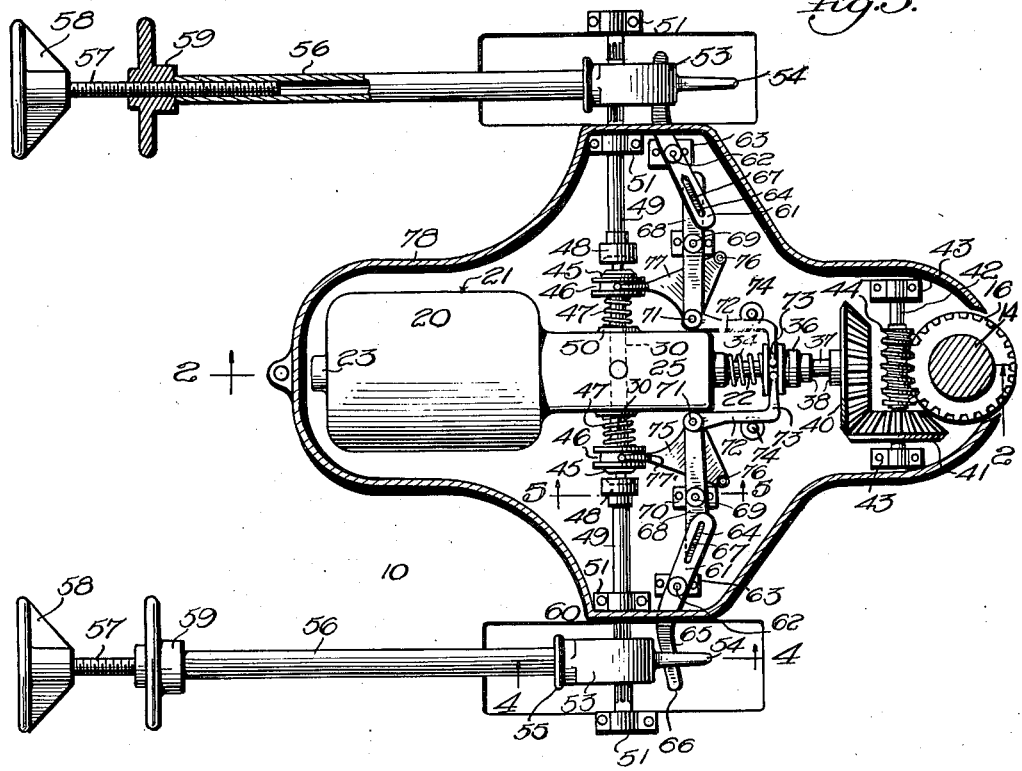
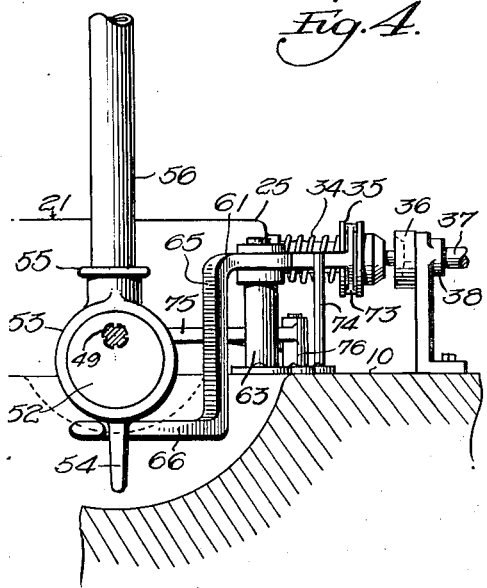
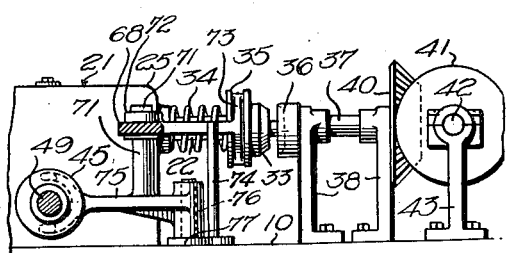
Inventor
P. J. KROLL
By C. L. Parker Jr.
Attorney Patented Dec. 29, 1936

2,065,714

UNITED STATES PATENT OFFICE 2,065,714

COMBINED VEHICLE LIFTING AND ROCKING APPARATUS

Philip J. Kroll, New York, N. Y.

Application December 18, 1934, Serial No. 758,130

15 Claims. (Cl. 73—51)

This invention relates to combined vehicle lifting and rocking apparatus, and more particularly to an apparatus for assisting in the lubrication of motor vehicles, and is an improvement over the devices disclosed in my copending applications Serial Nos. 730,981, filed June 16, 1934, 734,666, filed July 11, 1934, and 755,038 filed November 27, 1934.

As stated in my copending applications referred to, motor vehicle service stations are now commonly equipped with means for lubricating various parts of a motor vehicle, such as the shackle bolts, spring leaves, etc., and to provide access to the parts of the vehicle referred to, a vehicle is arranged over a greasing pit or on a vehicle lift. Lubricant is sprayed to the spring leaves and is supplied to such parts as the shackle bolts by means of suitable pressure apparatus for forcing the lubricant to the bearing surfaces. These types of lubricating apparatus are more effective than the former methods of lubricating the vehicle parts by hand, but are only partially effective due to the tight contact between the parts. This tight contact is maintained by the weight of the vehicle body, which renders it difficult for lubricant to force its way between all of the coacting bearing surfaces.

In my copending applications referred to I have described and claimed several forms of apparatus wherein the running gear of a motor vehicle is relieved of a substantial part of the weight of the vehicle body to relieve the tight engagement of the contacting bearing surfaces, together with means for rocking the vehicle body to effect relative movement between the spring leaves and shackle bolts so as to assist in the movement of the lubricant between the surfaces to be lubricated.

An important object of the present invention is to provide a combined vehicle lift and lubricating apparatus by means of which a vehicle may be elevated to provide access to the under side thereof, and wherein the vehicle body may be supported and rocked to assist in the proper distribution of the lubricant.

A further object is to provide such an apparatus wherein a single source of power is employed for elevating a motor vehicle and for effecting the rocking action of the body thereof.

A further object is to provide an apparatus of the character referred to having means for rendering the elevating means and rocking means selectively operative and inoperative as desired.

A further object is to provide an apparatus of the character referred to having transmission means between the power source and the vehicle lifting means, and provided with means for rendering such transmission means inoperative when the vehicle rocking devices are in operation.

A further object is to provide means for rendering the rocking devices inoperative while the vehicle is being elevated or lowered.

A further object is to provide a combined vehicle lifting and lubricating apparatus having a source of power operative through suitable transmission means for elevating the vehicle, and provided with jack shafts movable to vertical position for elevating and rocking the vehicle body, the jack shafts being movable to substantially horizontal inoperative positions and having means associated therewith for automatically rendering the lifting means inoperative when the jack shafts are moved to vertical position.

Other objects and advantages of the invention will become apparent during the course of the following description.

In the drawings I have shown one embodiment of the invention. In this showing—

Figure 1 is a side view of the apparatus showing certain of the parts in operative position.

Figure 2 is an enlarged central vertical sectional view taken axially through the power source and associated elements as indicated by line 2—2 of Figure 3, Figure 3 is a plan view of the apparatus showing the jack shafts in horizontal position, the elevating shaft being shown in section and parts being broken away, Figure 4 is an enlarged sectional view on line 4—4 of Figure 3, Figure 5 is a similar view on line 5—5 of Figure 3, and, Figure 6 is a diagrammatic representation of an electrical circuit adapted for use in connection with the apparatus.

Referring to Figures 1 and 2, the numeral 10 designates a concrete floor or platform on which the apparatus is adapted to be supported, and a concrete or similar well 11 contains portions of the vehicle lifting means to be described. A relatively heavy sleeve 12 extends downwardly into the well and is flanged as at 13 to be supported on the platform 10. A heavy vertical screw threaded shaft 14 extends through the sleeve 12 and is vertically slidable therein. A thrust bearing 15 is arranged on the upper end of the sleeve 12 and supports a worm wheel 16 internally threaded to receive the threads of the shaft 14.

A collar 17 is secured in any suitable manner on the upper end of the screw 14 and supports vehicle rails 18 on opposite sides thereof. These rails may be of the type conventionally employed in ordinary vehicle lifts, and are preferably of channeled cross-section with upstanding flanges at opposite edges. These rails may be connected to and supported by the collar 17 by any suitable means (not shown).

A motor 19 is arranged in one end 20 of a casing 21 and has one end of its armature shaft 22 journaled in a bearing 23 formed in one end of the casing. The casing is divided by a partition 24 to form a second casing section 25. The armature shaft 22 extends through bearings 26 and 27 formed respectively in the partition 24 and in the end wall of the casing 25. Within the casing section 25, the shaft 22 is provided with a worm 28 meshing with a worm wheel 29 mounted on a shaft 30. This shaft is arranged below and extends transversely of the shaft 22, and the worm wheel 29 is arranged within the lower semicircular portion 31 of the casing section 25, the platform 10 being recessed as at 32 to provide space for the casing section.

Beyond the casing section 25, the shaft 22 is provided with a clutch element 33 normally urged in one direction by a compression spring 34. The clutch element 33 is provided with an annular groove 35 to receive operating means to be referred to. A coacting clutch element 36 is engageable by the clutch element 33 and is carried by a shaft 37 supported in bearings 38. These bearings may be suitably connected to the platform 10 to be supported thereby. The end of the shaft 37 is axially recessed as at 39 to receive the reduced adjacent end of the shaft 22 to rigidly support the two shafts in proper alinement.

A bevel gear 40 is carried by the shaft 37 and meshes with a similar gear 41 carried by a transverse shaft 42 supported at its ends in bearings 43 mounted on the platform 10. The shaft 42 carries a worm 44 meshing with the worm wheel 16. It will be apparent that rotation of the gear 40 rotates the gear 41 and worm 44 whereby the latter rotates the worm wheel 16 and thus effects vertical movement of the screw shaft 14. While the worm 44 could be arranged directly on the shaft 37 with the latter moved to one side of the screw shaft 14 to permit such construction, it is preferred that the arrangement illustrated be employed in order that bevel gears 40 and 41 of different sizes may be employed, and in order that the parts of the apparatus may be more symmetrically arranged.

The transverse shaft 30 carries clutch elements 45 at opposite ends thereof, and each of these clutch elements is provided with an annular groove 46 to receive operating means to be referred to. The clutch elements 45 are splined on the shaft 30 and are urged outwardly by springs 47 to engage coacting clutch elements 48 mounted respectively on shafts 49 arranged beyond the ends of and in alinement with the shaft 30. The shafts 30 and 49 are preferably connected by pilot means similar to the connection between the shafts 22 and 37 to maintain the shafts in proper alinement. The shaft 30 is supported by bearings 50 in the sides of the casing section 25, while each shaft 49 is supported in bearings 51 secured to the platform 10.

Each shaft 49 is provided between its bearings 51 with an eccentric cam 52 surrounded by a cam housing 53, and each cam housing is provided with a depending operating finger 54 for a purpose to be described. Diametrically opposite the finger 54, each cam housing 53 is provided with a sleeve portion 55 in which is threaded a tubular member 56. Each tubular member slidably receives a threaded shaft 57 to the end of which is secured a vehicle frame engaging member 58. A rotatable sleeve 59 seats against the end of each tube 56 and has threaded engagement with one of the screws 57. The elements 56, 57, 58 and 59 constitute a pair of jack shafts which are operative in a manner to be described for elevating and rocking a vehicle body. The jack shafts are normally arranged in horizontal position and are adapted to be swung to vertical position to bring the members 58 into engagement with the vehicle frame, and the cams 52 are preferably splined to the shafts 49 to permit the jack shafts to be adjusted inwardly and outwardly in accordance with the width of the vehicle frame.

At each side of the apparatus, a lever 61 is pivotally supported as at 62 by a post 63 secured to the platform 10. One end of the lever 61 is slotted as at 64, for a purpose to be described. The other end of the lever extends downwardly as at 65 and then horizontally as at 66, and the end 66 of the lever is engageable by one of the fingers 54. The slot 64 of each lever 61 receives a pin 67 carried by one end of a lever 68 pivotally supported as at 69 by a post or bracket 70 similar to the post 63 and mounted on the platform 10. The other end of the lever 68 is provided with a pivot pin 71 connecting it to an arm 72 having a fork 73 at its free end engaging the annular groove 35 to shift the clutch member 33. A guide post 74 prevents outward movement of the arm 72 as will be apparent.

A bell crank lever 75 is pivotally supported as at 76 upon a bracket 77 supported by the platform 10. One end of the bell crank lever is pivotally connected to the pivot pin 71 while the other end of this lever is provided with a fork 77′ engaging one of the annular grooves 46.

The present apparatus is adapted to be mounted at any suitable point on the platform of a vehicle service station, and it will be noted that most of the operating parts are arranged very close to the platform to permit an operator to have substantially unrestricted movement beneath a vehicle. It is preferred that a steel hood 78 be provided on which an operator can stand, and this hood extends across the apparatus between the inner bearings 51 and from the bearing 23 of the motor to a point adjacent the worm wheel 16, as clearly shown in Figure 3. When the lift is elevated to the solid line position shown in Figure 1, the jack shafts are movable to the vertical position indicated. For the purpose of illustration, a portion of a vehicle has been indicated in position on the rails 18, and includes side frame members 79 and wheels 80.

In Figure 6 of the drawings a wiring diagram is illustrated for use in connection with the apparatus. Line wires 81 lead to binding posts 82 from which wires 83 extend to the central contacts 84 of a conventional reversing switch. The movable element of this switch is connected in any suitable manner (not shown) to the lift portion of the apparatus to be moved in one direction into engagement with contacts 85 and 86, when the lift reaches a predetermined upper position, and into engagement with contacts 87 and 88 when the lift reaches its lowermost position. One contact 89 of the motor is connected to the contacts 85 and 87 by wires 90 and 91 respectively, while the contacts 86 and 88 are connected by wires 92 and 93 to switch contacts 94 and 95 respectively. A switch 96 is selectively movable into engagement with the contacts 94 and 95 and is connected as at 97 to the other contact of the motor 19.

The operation of the apparatus is as follows:

The rails 18 are normally arranged in their lowermost position adjacent the platform 10, and the jack shafts are normally horizontally arranged, as shown in Figure 3, in contact with the platform 10. When it is desired to lubricate a vehicle, the latter may be driven into position on the rails 18 in the usual manner. The reversing switch is in engagement with the contacts 87 and 88 and the switch 96 then may be moved into engagement with the contact 95 to close the circuit through the motor 19. At such time the clutch elements 33 and 36 will be in engagement, and accordingly the motor will drive the shafts 22 and 37 to rotate gears 40 and 41, thus rotating the worm 44 and worm wheel 16. The latter element is supported on the thrust bearing 15, and accordingly is fixed against downward movement.

Rotation of the worm wheel 16 thus feeds the shaft 14 upwardly, thus elevating the vehicle lift until the latter reaches the solid line position shown in Figure 1, whereupon the reversing switch will be moved out of engagement with the contacts 87 and 88 and into engagement with the contacts 85 and 86, ready for the reversal of the motor 19 and the lowering of the lift at the proper time. Under the conditions being considered, the circuit to the motor will be broken, since the switch 96 is arranged in engagement with the contact 95. Thus it will be apparent that the motor will be automatically stopped when it reaches a predetermined elevated position and cannot be moved higher because of the operation of the reversing switch.

When such elevated position is reached, the switch 96 will be moved by the operator to neutral or open position, whereupon the jack shafts may be moved to vertical position. It will be apparent that the apparatus is preferably operated by one attendant, in which case the jack shafts will be elevated one at a time. Upon the elevation of either jack shaft to vertical position, the finger 54 thereof will swing downwardly, thus moving the lever end 66 inwardly from the position shown in Figure 3 to the position shown in Figure 4. This action moves the other end of the lever 61 outwardly away from the shaft 49 and imparts the same movement to the adjacent end of the lever 68. Accordingly the other end of this lever will move inwardly, thus transmitting inward movement to the clutch collar 35 to disengage the clutch element 33 from the coacting element 36. Thus the lift means will be rendered completely inoperative.

When the first jack shaft is elevated to vertical position, the engaging element 58 thereof is placed beneath the adjacent vehicle frame member 79, whereupon the collar 59 is rotated by a spanner wrench or other suitable tool to feed the screw 57 upwardly and thus elevate the adjacent side of the vehicle frame. This operation is then repeated with the other jack shaft, and accordingly it will be apparent that the weight of the vehicle body is relieved from the springs and shackle bolts.

With the jack shafts thus arranged in vertical position, the apparatus is ready to rock the vehicle during the lubricating operation. As previously stated, the movement of either jack shaft to vertical position will disengage the clutch element 35, and this operation also releases the clutch elements 45 for engagement with the coacting elements 48. It will be apparent that inward movement of the pivot pins 71 transmits movement to the bell crank levers 75 to rotate them in a counter-clockwise direction about the pivots 76, to thus release the clutch elements 46 and connect the shaft 30 to the shafts 49.

The switch 96 is then moved into engagement with the contact 94, thus again closing a circuit through the motor 19 to cause the latter to operate. The lift means will remain inoperative because of the disengagement of the clutch elements 33 and 36, but the shafts 49 and cams 52 will be driven by the worm 28 and worm wheel 29. The cams 52 operating in the cam housing 53, will vertically reciprocate the jack shafts. Referring to Figure 3 it will be noted that the cams 52 and cam housings 53 of the two shafts 49 are oppositely arranged, and during the reciprocation of the jack shaft, one of these devices will be moving upwardly while the other is moving downwardly. Accordingly the vehicle will be rocked laterally, and during such time, the springs and shackle bolts of the vehicle will be relieved of the weight of the vehicle body. During this time lubricant may be supplied to the shackle bolts by the usual pressure means, and the spring leaves may be sprayed with lubricant with the usual means employed for this purpose. The relieving of the spring leaves and shackle bolts of the weight of the vehicle body and the relative movement continuously maintained between these parts due to the rocking of the vehicle body greatly assists in lubricating the parts far more efficiently than is done under present conditions.

When the lubricating operation is completed, the switch 96 is again moved to open or neutral position, thus stopping the motor. The collars 59 are then rotated to release the engaging members 58 from the vehicle frame, whereupon the jack shafts are swung downwardly to normal horizontal position. This movement reverses the previously described operation of the levers 61, 68 and 75 and arms 72, whereupon it will be apparent that the clutch element 33 is released for engagement with the coacting member 36, while the clutch elements 45 are released from their coacting members 48. As previously stated, the reversing switch will have been moved into engagement with contacts 85 and 86 when the lift reached its upper position, and the switch 96 is again closed by moving it into engagement with contact 94 to operate the motor and lower the lift to the dotted line position shown in Figure 1. When the lift reaches its lowermost position, the reversing switch will be moved out of engagement with the contacts 85 and 86, and into engagement with the contacts 87 and 88, whereupon the motor 19 will cease to operate, and the switch 96 may be returned to neutral position. The vehicle then may be driven from the lift in the usual manner.

From the foregoing it will be apparent that the present apparatus provides combined lifting means for a vehicle and means for rocking the vehicle to facilitate the usual lubricating operations. It also will be apparent that only a single motor is employed both for lifting and rocking the apparatus. Attention is also invited to the fact that the jack shafts are operative when in vertical position for preventing the operation of the lifting means and for rendering the motor operative for rocking the vehicle upon the proper operation of the switch 96. With the exception of the lift and the jack shafts, all of the parts are arranged with their upper limits very close to the platform 10, and accordingly it will be apparent that an operator readily may step over such parts of the apparatus, or he may stand upon the protecting hood 78.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a vehicle lift, vehicle body rocking means movable between operative and inoperative positions, a power source for said lift and said rocking means, and means operative by said rocking means upon movement thereof to operative position for rendering said lift inoperative.

2. Apparatus of the character described comprising a vehicle lift, vehicle body rocking means, a power source for said lift and said rocking means, said rocking means being movable between a horizontal inoperative position and a vertical operative position, and means operative by movement of said rocking means from inoperative toward operative position for rendering said power source ineffective for operating said lift.

3. Apparatus of the character described comprising a vehicle lift, vehicle body rocking means, a power source for said lift and said rocking means, said rocking means being movable between a horizontal inoperative position and a vertical operative position, and means operative upon movement of said rocking means to operative position for disconnecting said power source from said lift.

4. Apparatus of the character described comprising a vehicle lift, vehicle body rocking means movable between operative and inoperative positions, a power source, transmission means between said power source and said rocking means, transmission means between said power source and said lift and including a clutch, and means operative by said rocking means upon movement thereof to operative position for rendering said clutch inoperative.

5. Apparatus of the character described comprising a vehicle lift, vehicle body rocking means, a power source, transmission means between said power source and said rocking means, transmission means between said power source and said lift and including a clutch, said rocking means being movable between a horizontal inoperative position and a vertical operative position, and means operative when said rocking means approaches operative position for disengaging said clutch.

6. Apparatus of the character described comprising a vehicle lift, vehicle body rocking means movable between operative and inoperative positions, a power source, transmission means between said power source and said lift including a clutch, transmission means between said power source and said rocking means including a clutch, and means operative by said rocking means upon movement thereof to operative position for rendering said clutches respectively inoperative and operative.

7. Apparatus of the character described comprising a vehicle lift, vehicle body rocking means, a power source, transmission means between said power source and said lift including a clutch, transmission means between said power source and said rocking means including a clutch, said rocking means being movable between a horizontal inoperative position and a vertical operative position, and means operative upon movement of said rocking means to operative position for rendering said first and second named clutches respectively inoperative and operative and upon movement of said rocking means to inoperative position for rendering said first and second named clutches respectively operative and inoperative.

8. Apparatus of the character described comprising a vehicle lift, a source of power having a drive shaft, transmission means between said drive shaft and said lift including a clutch, a pair of aligned shafts arranged transversely of said vehicle lift, transmission means between said drive shaft and said aligned shafts, cams carried by said aligned shafts, jack shafts operative by said cams and engageable with the body of a vehicle on said lift to transmit a rocking motion to said vehicle body, said jack shafts being movable between operative and inoperative positions, and means operative by a portion of one of said jack shafts upon movement thereof between operative and inoperative positions for rendering said clutch operative and inoperative.

9. Apparatus of the character described comprising a vehicle lift, a source of power having a drive shaft, transmission means between said drive shaft and said lift including a clutch, a pair of aligned shafts arranged transversely of said vehicle lift, transmission means between said drive shaft and said aligned shafts, cams carried by said aligned shafts, jack shafts operative by said cams and engageable with the body of a vehicle on said lift to transmit a rocking motion to said vehicle body, said jack shafts being movable between a horizontal inoperative position and a vertical operative position, and means operative upon movement of one of said jack shafts to operative position for disengaging said clutch.

10. Apparatus of the character described comprising a vehicle lift, a source of power having a drive shaft, transmission means between said drive shaft and said lift including a clutch, a pair of aligned shafts arranged transversely of said vehicle lift, transmission means between said drive shaft and said aligned shafts, cams carried by said aligned shafts, jack shafts operative by said cams and engageable with the body of a vehicle on said lift to transmit a rocking motion to said vehicle body, said jack shafts being movable between a horizontal inoperative position and a vertical operative position, operating means for said clutch, and means carried by one of said jack shafts and engageable with a portion of said operating means to disengage said clutch upon movement of said jack shaft to operative position.

11. Apparatus of the character described comprising a vehicle lift having a threaded vertical shaft, a rotatable collar threaded on said shaft and fixed against vertical movement, a power source, transmission means between said power source and said collar including a clutch, a pair of rotatable shafts arranged transversely of said vehicle lift, transmission means between said power source and said pair of shafts, a cam carried by each shaft of said pair, a cam housing surrounding each cam, a jack shaft connected to each cam housing and having means engageable with the frame of a vehicle on said lift, said jack shafts being movable between operative and inoperative positions, said cams being arranged in opposed relation, and means including an element carried by one of said cam housings and operative upon movement of the associated jack shaft to operative position for disengaging said clutch.

12. Apparatus of the character described comprising a vehicle lift having a threaded vertical shaft, a rotatable collar threaded on said shaft and fixed against vertical movement, a power source, transmission means between said power source and said collar including a clutch, a pair of rotatable shafts arranged transversely of said vehicle lift, transmission means between said power source and said pair of shafts, a cam carried by each shaft of said pair, a cam housing surrounding each cam, a jack shaft connecting each cam housing and having means engageable with the frame of a vehicle on said lift, said cams being arranged in opposed relation, said jack shafts being movable between horizontal inoperative position and vertical operative position, and means including an element carried by one of said cam housings and operative when the associated jack shaft is moved to vertical position for disengaging said clutch.

13. Apparatus of the character described comprising a vehicle lift, a source of power having a drive shaft, transmission means between said drive shaft and said lift including a clutch, a pair of aligned shafts arranged transversely of said vehicle lift, transmission means between said drive shaft and said aligned shafts including a clutch, an eccentric cam carried by each of said aligned shafts, a jack shaft operatively connected to each cam and movable between operative and inoperative positions, and means operative by one of said jack shafts upon movement thereof between operative and inoperative positions for rendering said clutches respectively operative and inoperative.

14. Apparatus of the character described comprising a vehicle lift, a source of power having a drive shaft, transmission means between said drive shaft and said lift including a clutch, a pair of aligned shafts arranged transversely of said vehicle lift, transmission means between said drive shaft and said aligned shafts including a clutch, an eccentric cam carried by each of said aligned shafts, a jack shaft operatively connected to each cam, said jack shafts being bodily rotatable about said cams between horizontal inoperative position and vertical operative position, and means operative upon movement of one of said jack shafts to operative position for rendering said first and second named clutches respectively inoperative and operative, and upon movement of such jack shaft to inoperative position for rendering said clutches respectively operative and inoperative.

15. Apparatus of the character described comprising a vehicle lift having a threaded vertical shaft, a rotatable collar threaded on said shaft and fixed against vertical movement, a power source, transmission means between said power source and said collar including a clutch, a pair of rotatable shafts arranged transversely of said vehicle lift, transmission means between said power source and said pair of shafts including a clutch, a circular eccentric cam carried by each shaft of said pair, a cam housing surrounding each cam, a jack shaft connected to each cam housing and having means engageable beneath the frame of a vehicle on said lift, said jack shafts being movable between horizontal inoperative position and vertical operative position, and means operative upon movement of one of said jack shafts to vertical position for rendering said first and second named clutches respectively inoperative and operative, and upon movement of such jack shaft to horizontal position for rendering said first and second named clutches respectively operative and inoperative.

PHILIP J. KROLL.